United States Patent
Koo et al.

(10) Patent No.: US 10,587,873 B2
(45) Date of Patent: Mar. 10, 2020

(54) METHOD AND APPARATUS FOR ENCODING AND DECODING VIDEO SIGNAL

(71) Applicant: LG Electronics Inc., Seoul (KR)

(72) Inventors: Moonmo Koo, Seoul (KR); Sehoon Yea, Seoul (KR); Kyuwoon Kim, Seoul (KR); Bumshik Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 15/768,326

(22) PCT Filed: Oct. 13, 2016

(86) PCT No.: PCT/KR2016/011507
§ 371 (c)(1),
(2) Date: Apr. 13, 2018

(87) PCT Pub. No.: WO2017/065532
PCT Pub. Date: Apr. 20, 2017

(65) Prior Publication Data
US 2018/0324418 A1 Nov. 8, 2018

Related U.S. Application Data

(60) Provisional application No. 62/241,120, filed on Oct. 13, 2015.

(51) Int. Cl.
*H04N 19/11* (2014.01)
*H04N 19/147* (2014.01)
(Continued)

(52) U.S. Cl.
CPC ........... *H04N 19/11* (2014.11); *H04N 19/147* (2014.11); *H04N 19/176* (2014.11); *H04N 19/593* (2014.11)

(58) Field of Classification Search
CPC ..... H04N 19/11; H04N 19/147; H04N 19/593
(Continued)

(56) References Cited

U.S. PATENT DOCUMENTS

2011/0292994 A1* 12/2011 Lim ...................... H04N 19/182
375/240.02
2016/0127725 A1* 5/2016 Jamali .................. H04N 19/103
375/240.12

FOREIGN PATENT DOCUMENTS

KR 2013005233 A 1/2013
KR 2013034559 A 4/2013
(Continued)

*Primary Examiner* — Jeffery A Williams
(74) *Attorney, Agent, or Firm* — Fish & Richardson P.C.

(57) ABSTRACT

The present invention provides a method for processing a video signal, comprising generating a prediction block for a neighbor block using a reconstructed reference pixel of the neighbor block when the neighbor block adjacent to a current block is intra-coded; determining a refined intra prediction mode of the neighbor block based on the prediction block, where the refined intra prediction mode represents a mode which minimizes an error between the prediction block and a reconstructed neighbor block; generating a prediction mode candidate list for the current block based on the refined intra prediction mode; selecting an intra prediction mode for the current block from the prediction mode candidate list; and performing a prediction for the current block based on the intra prediction mode.

12 Claims, 15 Drawing Sheets

(51) Int. Cl.
*H04N 19/593* (2014.01)
*H04N 19/176* (2014.01)
(58) Field of Classification Search
USPC .................................................. 375/240.12
See application file for complete search history.

(56) References Cited

FOREIGN PATENT DOCUMENTS

| KR | 2014098113 A | 8/2014 |
| KR | 2015042268 A | 4/2015 |
| KR | 2015059142 A | 5/2015 |

* cited by examiner

[FIG. 1]
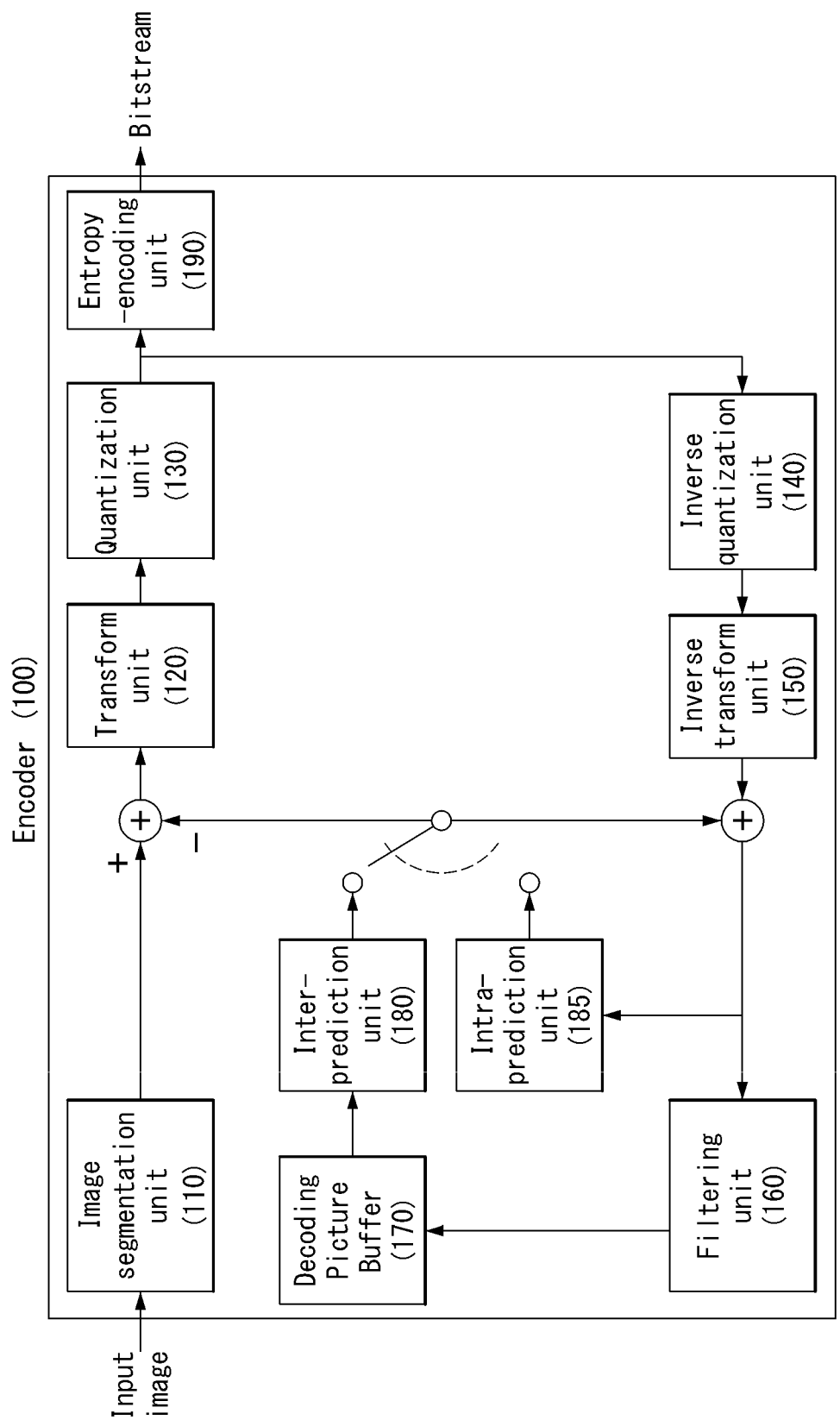

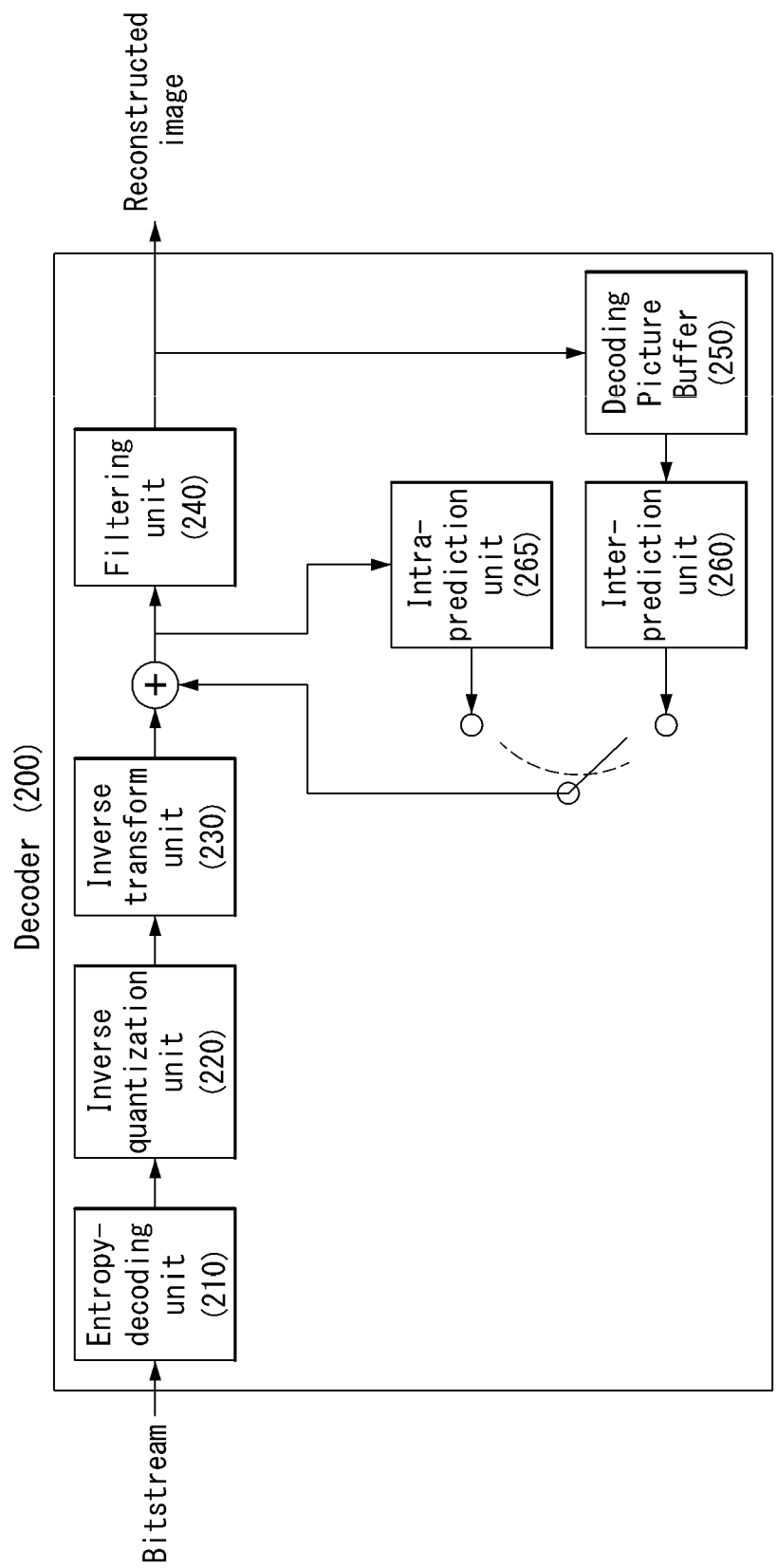
[FIG. 2]

[FIG. 3]
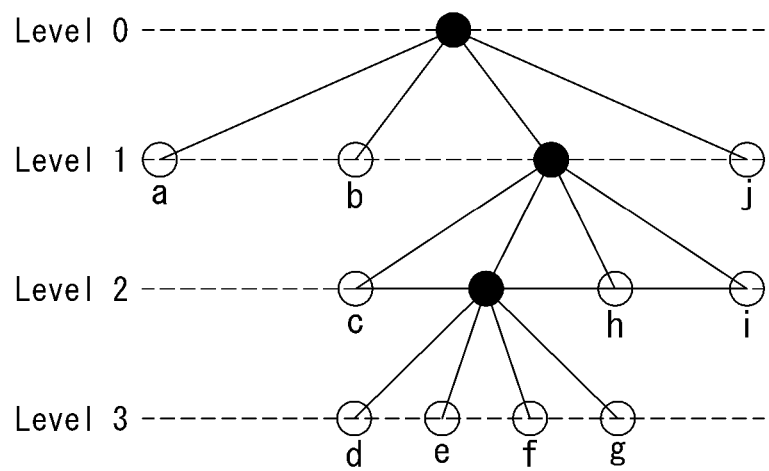
(a)
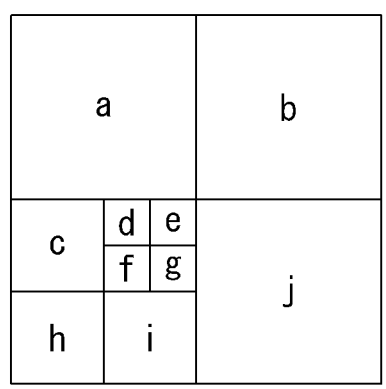
(b)

[FIG. 4]
Intra:
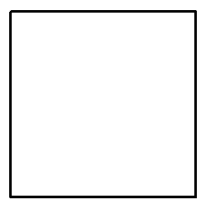 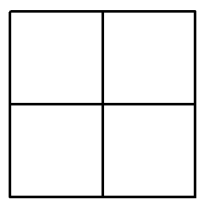
2Nx2N          NxN
Inter:
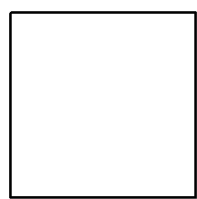 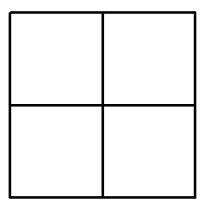 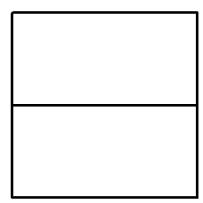 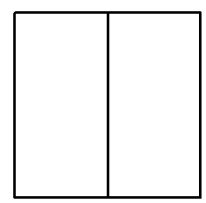
2Nx2N          NxN           2NxN          Nx2N
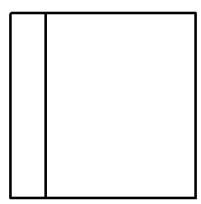 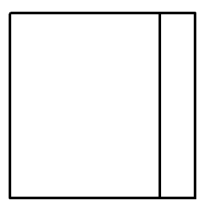 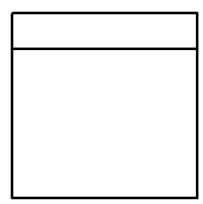 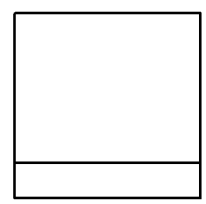
nLx2N          nRx2N         2NxnU         2NxnD

[FIG. 5]
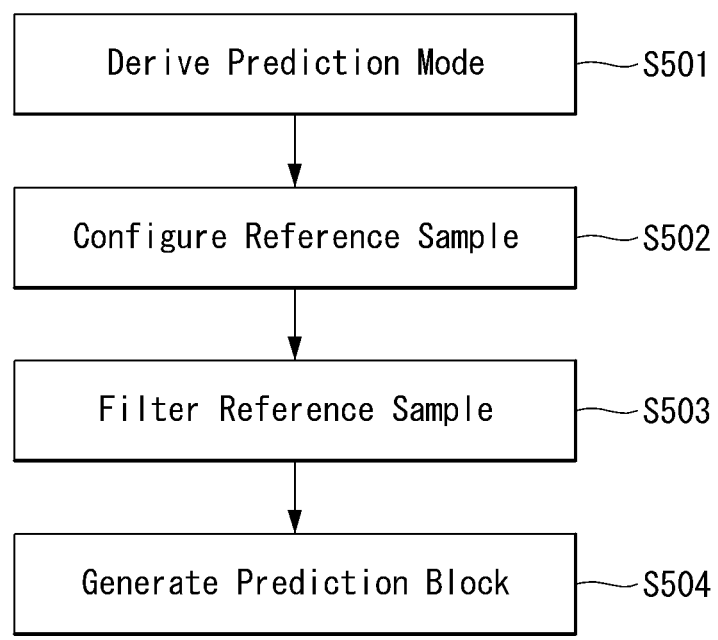

[FIG. 6]
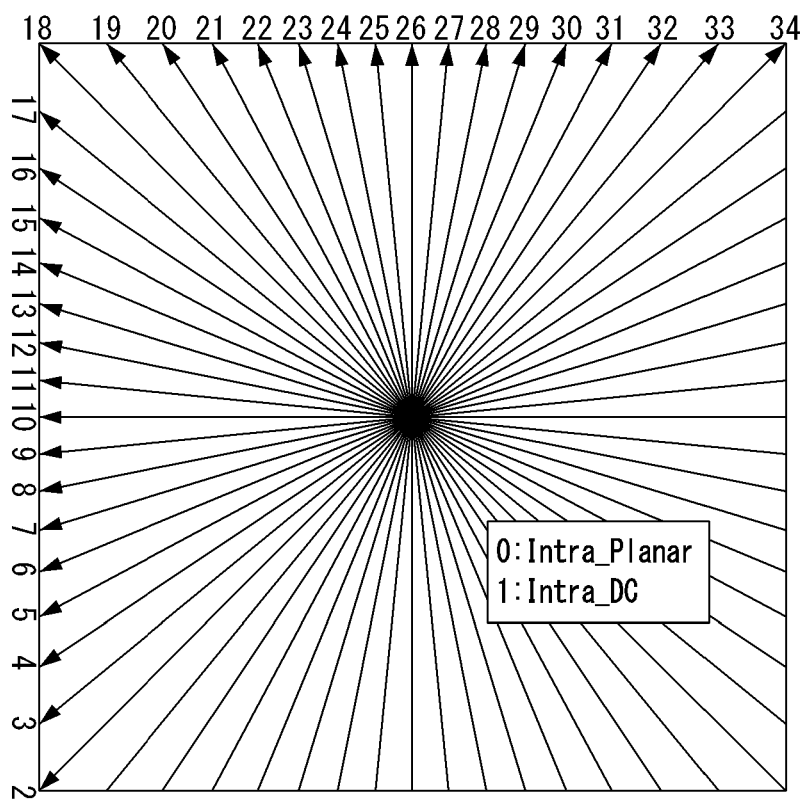

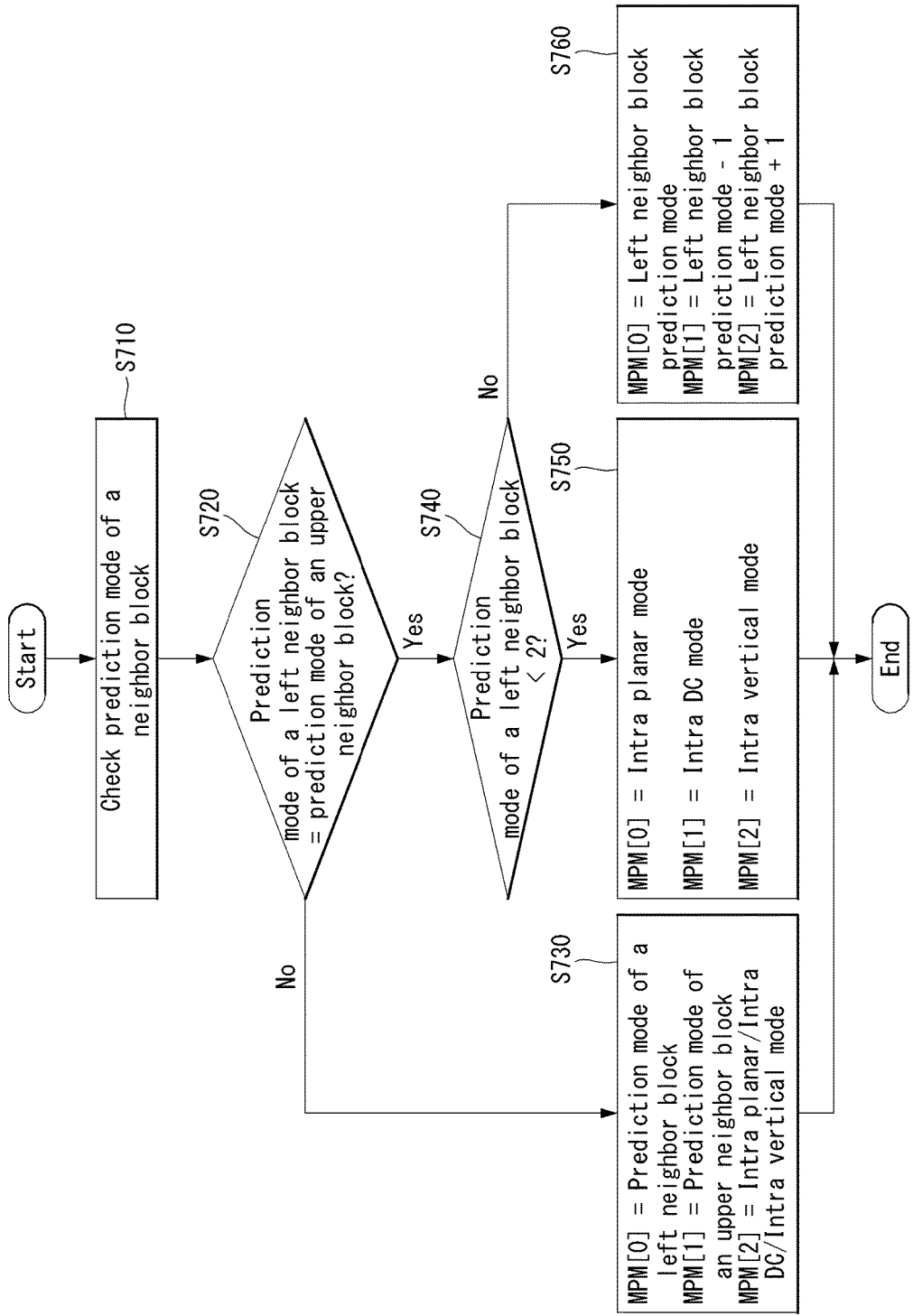
[FIG. 7]

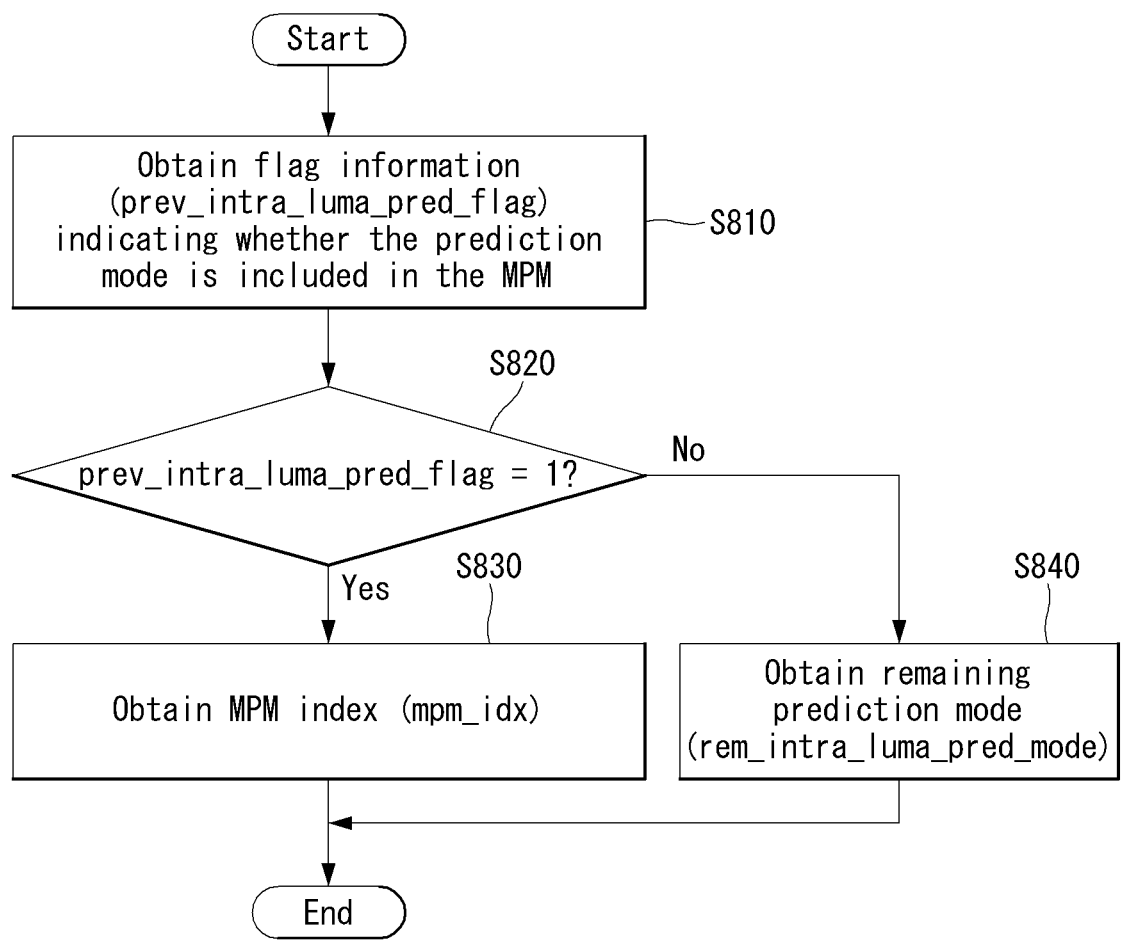

[FIG. 9]
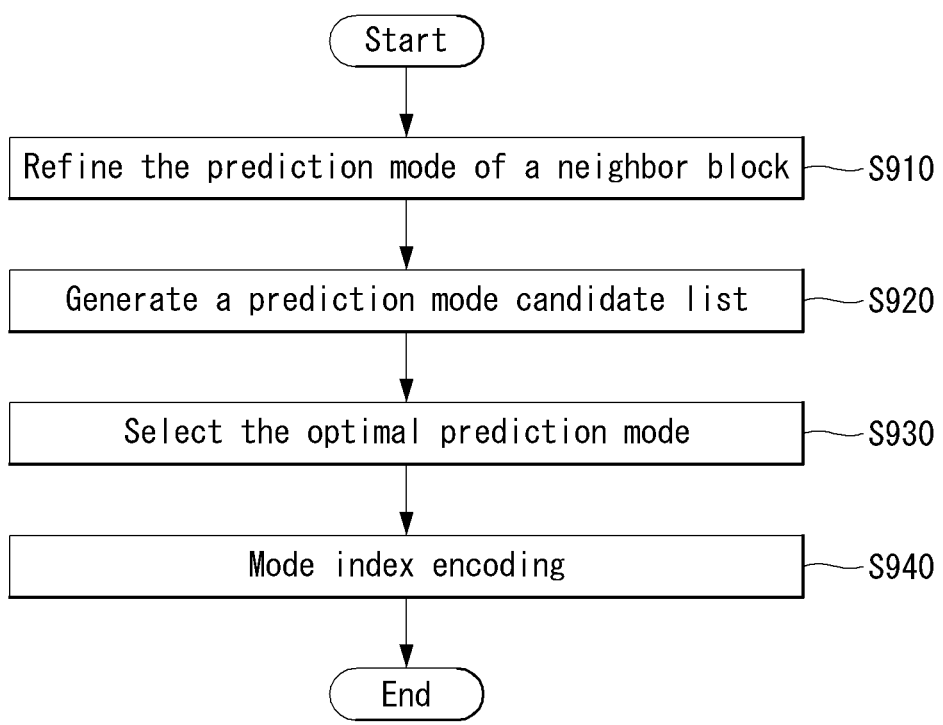

[FIG. 10]
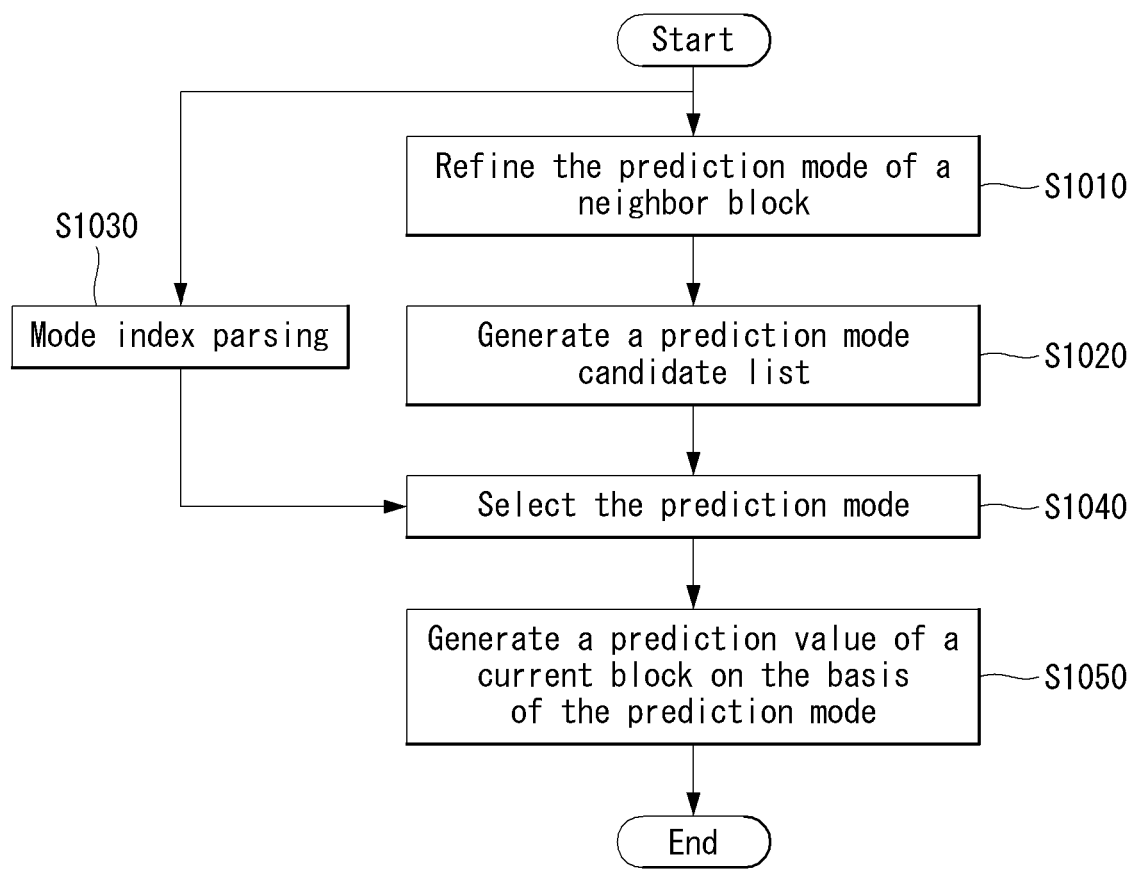

[FIG. 11]
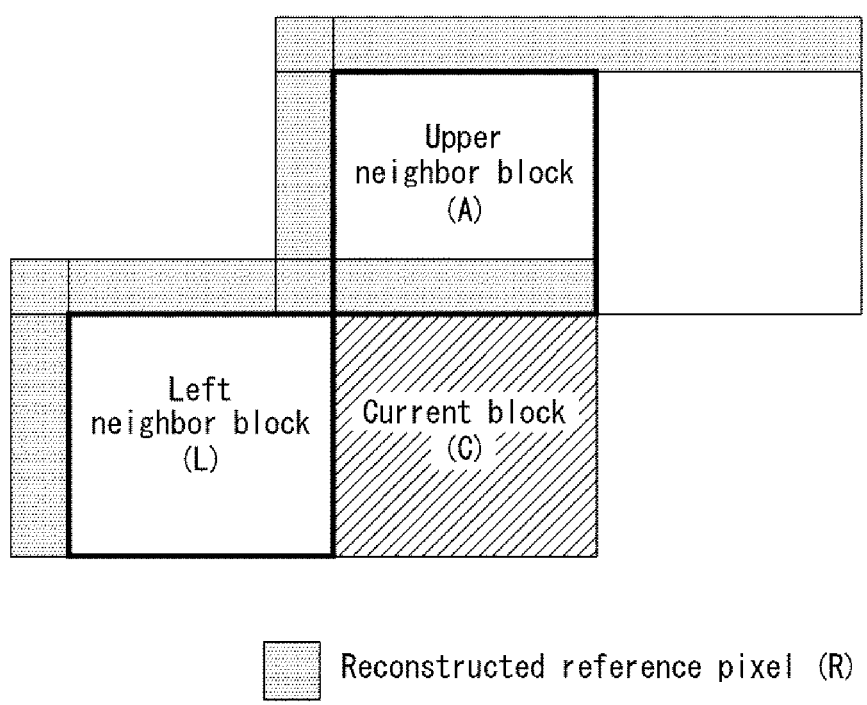

【FIG. 12】
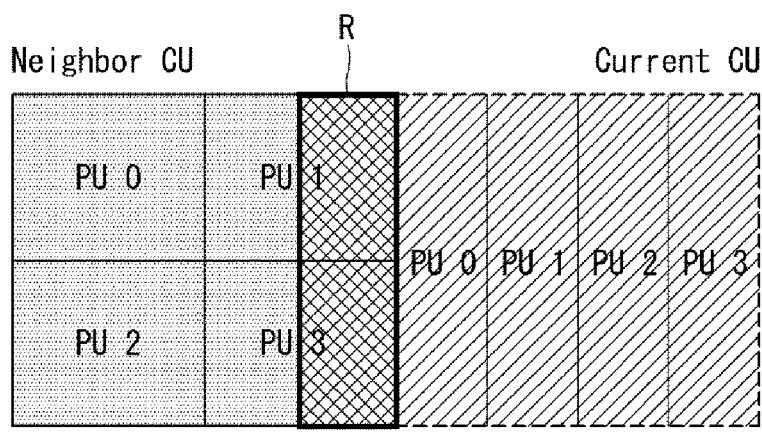
【FIG. 13】
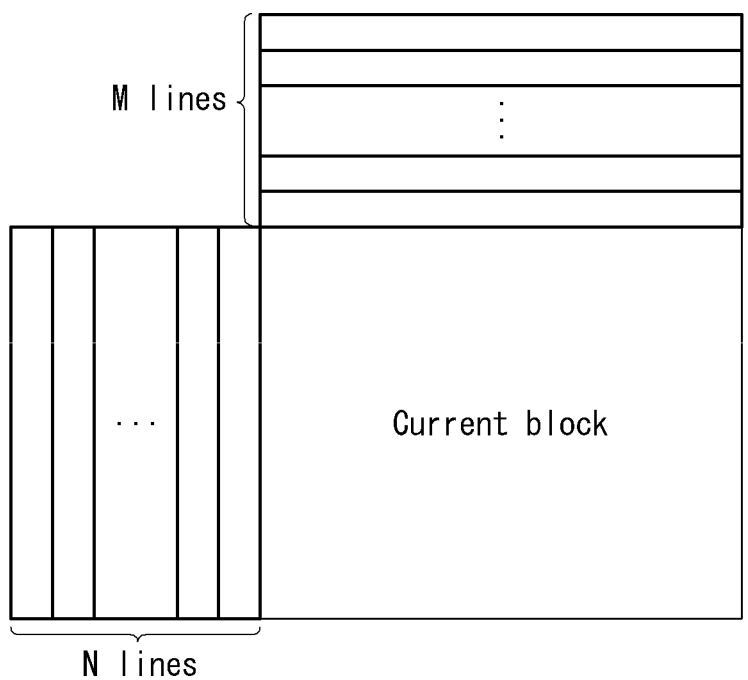

[FIG. 14]
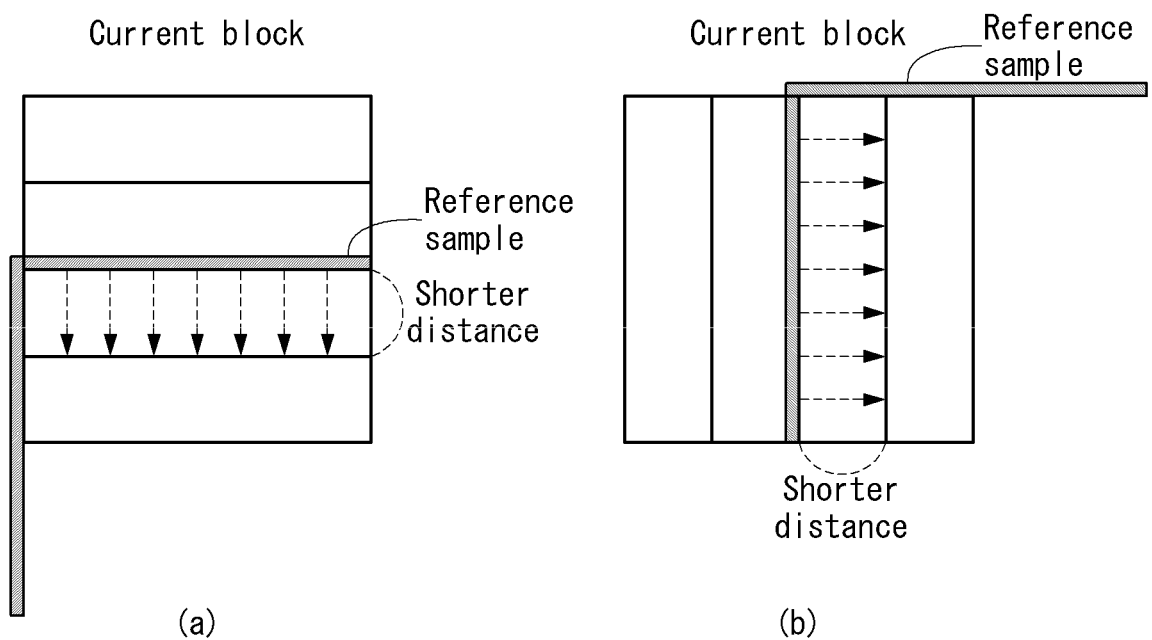

【FIG. 15】
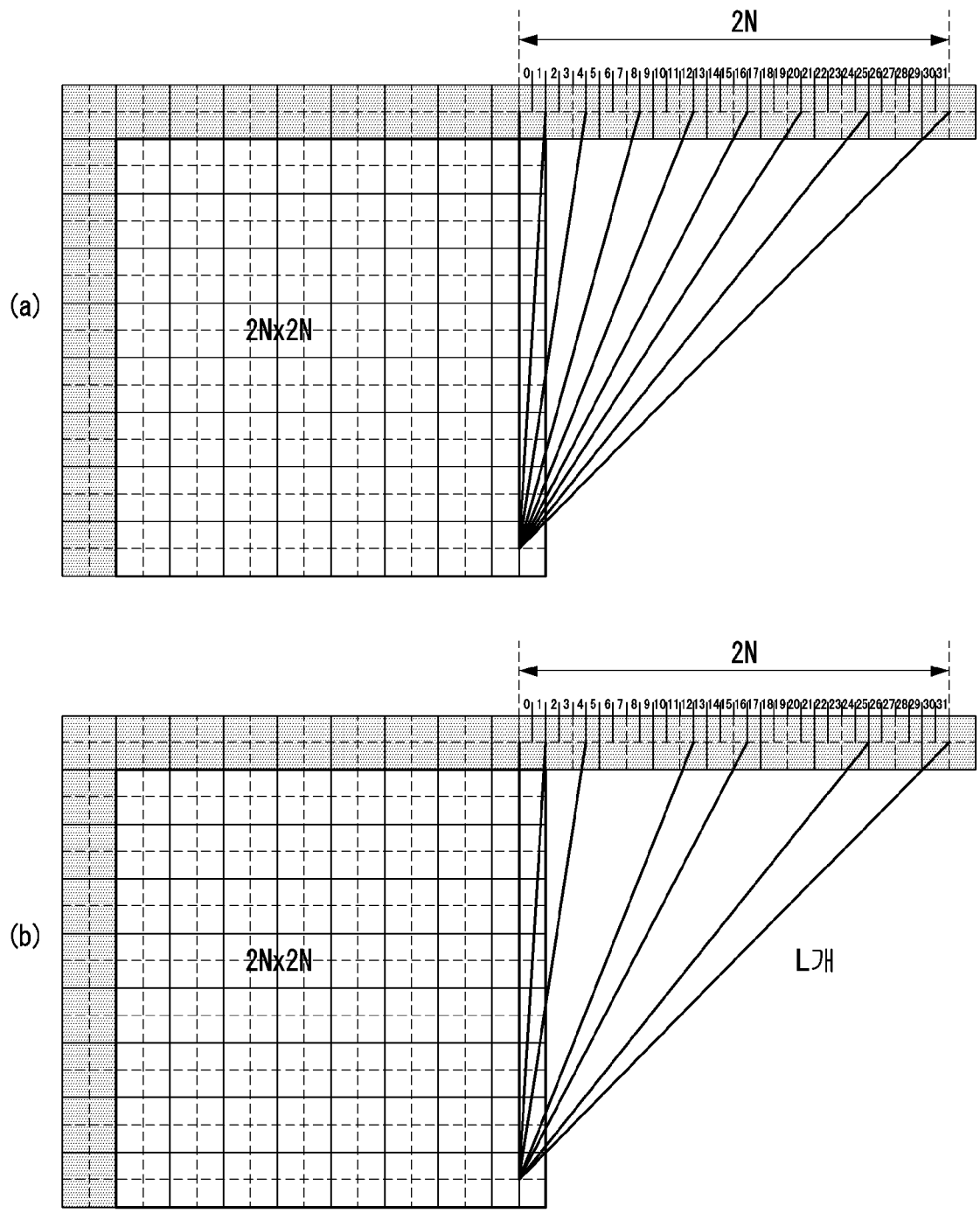

[FIG. 16]
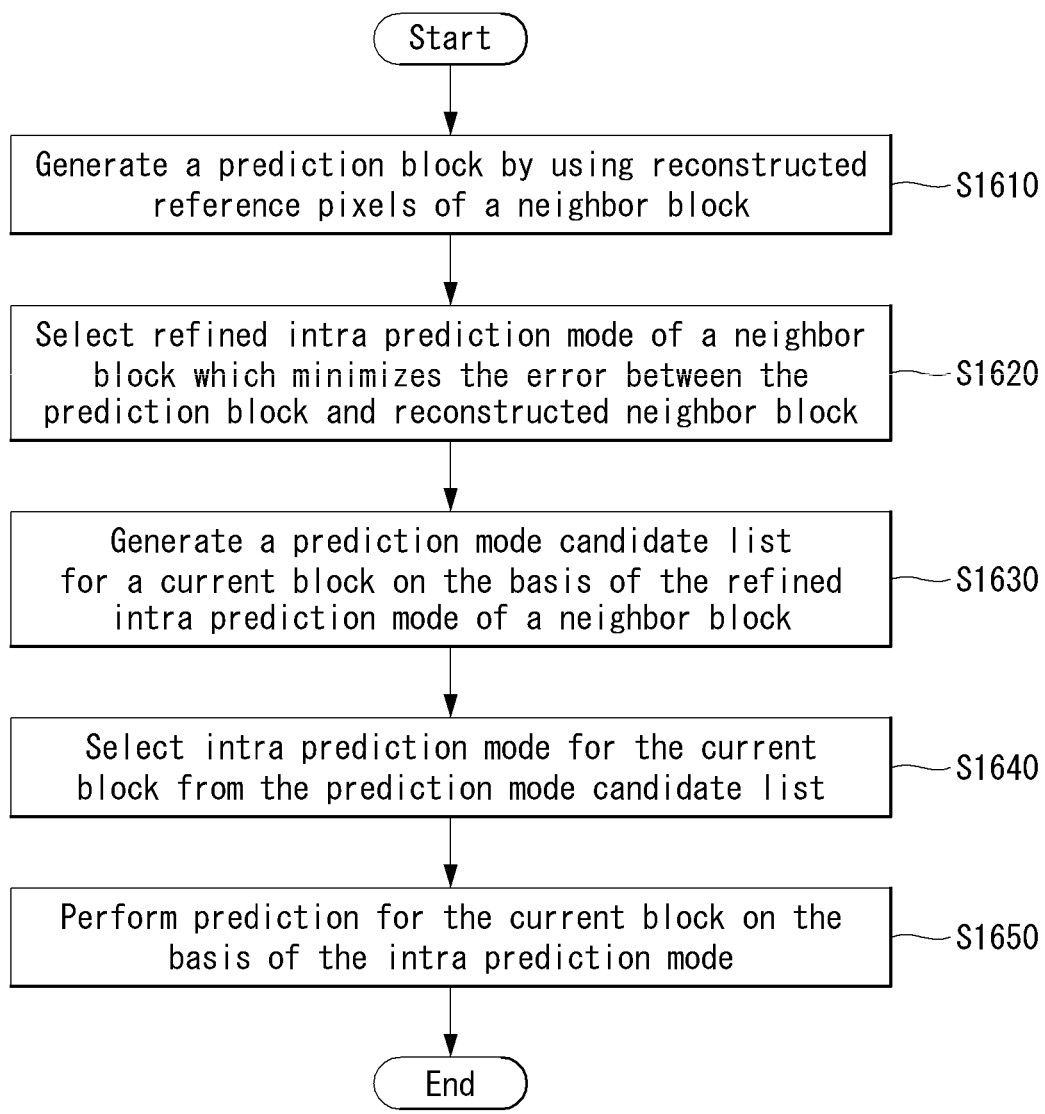

METHOD AND APPARATUS FOR ENCODING AND DECODING VIDEO SIGNAL

CROSS-REFERENCE TO RELATED APPLICATIONS

This application is a National Stage application under 35 U.S.C. § 371 of International Application No. PCT/KR2016/011507, filed Oct. 13, 2016, which claims the benefit of U.S. Application No. 62/241,120, filed on Oct. 13, 2015. The disclosures of the prior applications are incorporated by reference in their entirety.

TECHNICAL FIELD

The present invention is related to a method and an apparatus for encoding/decoding a video signal. More specifically, the present invention is related to a method and an apparatus for refining a prediction mode of a neighbor block.

BACKGROUND ART

Compression encoding means a series of signal processing technology for transmitting digitalized information through a communication line or for storing digitalized information in a form appropriate to a storage medium. Media such video, an image, and a voice may be a target of compression encoding, particularly, technology that performs compression encoding using video as a target is referred to as video compression.

Next generation video contents will have a characteristic of a high spatial resolution, a high frame rate, and high dimensionality of scene representation. In order to process such contents, memory storage, memory access rate, and processing power technologies will remarkably increase.

Therefore, it is necessary to design a coding tool for more efficiently processing next generation video contents.

In particular, in the case of coding a prediction mode, the prediction mode of a neighbor block is employed to predict the prediction mode of a current block. The more accurate the prediction mode of a neighbor block is, the more accurate the prediction mode of a current block may be predicted. Therefore, it is necessary to improve the prediction mode of a neighbor block.

DISCLOSURE

Technical Problem

The present invention is to provide a method for refining a prediction mode of a neighbor block.

The present invention is to provide a method for generating a new prediction mode candidate list on the basis of a refined prediction mode of a neighbor block.

The present invention is to provide a method for selecting the optimal prediction mode of a current block.

The present invention is to provide a method for performing more efficient prediction coding through refinement of a prediction mode of a neighbor block.

The present invention is to provide a method for signaling information needed to perform the methods described above.

Technical Solution

One embodiment of the present invention provides a method for performing prediction for prediction mode candidates by using at least one of reconstructed pixels of a spatially neighboring block or adjacent reference pixels and minimizing a cost representing similarity to a reconstructed block.

One embodiment of the present invention provides a method for deriving an intra prediction mode through a prediction mode refinement method even if a neighbor block of an intra prediction block within an inter prediction picture is not an intra prediction block.

Even if a neighbor block of a current block is coded according to a coding scheme different from that of the current block, one embodiment of the present invention provides a method for refining the prediction mode of the neighbor block so that the refined prediction mode is appropriate for the coding scheme applied to the current block. For example, the different coding scheme may include at least one of Conditional Nonlinear Transform (CNT), Short Distance Intra Prediction (SDIP), and adaptive intra prediction coding scheme.

One embodiment of the present invention provides a method for refining a coding mode when the shape and the size of a neighbor block are different from those of a current block.

One embodiment of the present invention provides a method for changing the shape or the type of a neighbor block to be the same as that of a current block or using the original shape (or type) of the neighbor block.

One embodiment of the present invention provides a method for determining a prediction direction more accurately by setting the width or the height of a neighbor block to occupy as many as M or N lines.

The present invention provides a method for signaling information needed to perform the methods above.

Advantageous Effects

The present invention refines the intra prediction mode of a neighbor block and uses the refined intra prediction mode to predict the prediction mode of a current block, thereby predicting the intra prediction mode more accurately.

Also, when a still image or a video is compressed according to an intra prediction mode, the present invention improves accuracy of a prediction mode by refining the prediction mode for spatially neighboring blocks, thereby considerably reducing the amount of compression data in the case of complex images.

DESCRIPTION OF DRAWINGS

FIG. 1 is a block diagram illustrating a configuration of an encoder for encoding a video signal according to an embodiment of the present invention.

FIG. 2 is a block diagram illustrating a configuration of a decoder for decoding a video signal according to an embodiment of the present invention.

FIG. 3 is a diagram illustrating a division structure of a coding unit according to an embodiment of the present invention.

FIG. 4 is an embodiment to which the present invention is applied and is a diagram for illustrating a prediction unit.

FIG. 5 is a diagram for describing an intra prediction method, as an embodiment to which the present invention is applied.

FIG. 6 is a diagram for describing a prediction direction according to an intra prediction mode, as an embodiment to which the present invention is applied.

FIG. 7 is a flow diagram illustrating a method for encoding an intra prediction mode according to an embodiment of the present invention.

FIG. 8 is a flow diagram illustrating a method for decoding an intra prediction mode according to an embodiment of the present invention.

FIG. 9 is a flow diagram illustrating a method for encoding a video signal on the basis of a refined prediction mode of a neighbor block according to an embodiment of the present invention.

FIG. 10 is a flow diagram illustrating a method for decoding a video signal on the basis of a refined prediction mode of a neighbor block according to an embodiment of the present invention.

FIG. 11 illustrates a method for refining a prediction mode of a neighbor block according to an embodiment of the present invention.

FIG. 12 illustrates a method for refining a prediction mode of a neighbor block according to an embodiment of the present invention when the neighbor block is not intra-coded.

FIG. 13 illustrates a method for refining a prediction mode of a neighbor block on the basis of the shape or the size of a neighbor block according to an embodiment of the present invention.

FIG. 14 illustrates a method for performing intra prediction on the basis of a relationship between block partition information and direction of a coding mode according to an embodiment of the present invention.

FIG. 15 illustrates adaptive mode selection when an intra prediction mode is performed with 1/M precision according to an embodiment of the present invention.

FIG. 16 is a flow diagram illustrating a method for refining a prediction mode of a neighbor block according to an embodiment of the present invention.

MODE FOR INVENTION

In a method for processing a video signal, the present invention provides a method including, when a neighbor block adjacent to a current block is intra-coded, generating a prediction block for the neighbor block by using a reconstructed reference pixel of the neighbor block; determining a refined intra prediction mode of the neighbor block based on the prediction block, where the refined intra prediction mode is a mode which minimizes an error between the prediction block and the reconstructed neighbor block; generating a prediction mode candidate list for the current block based on the refined intra prediction mode; selecting an intra prediction mode for the current block from the prediction mode candidate list; and performing prediction for the current block based on the intra prediction mode.

In the present invention, a prediction block for the neighbor block is generated for the entire intra prediction modes, and the refined intra prediction mode is a mode which minimizes an error from the reconstructed neighbor block based on prediction blocks generated with respect to the entire intra prediction modes.

In the present invention, a prediction block for the neighbor block is generated for a specific intra prediction mode, the specific intra prediction mode represents an intra prediction mode within a predetermined range from the intra prediction mode of the neighbor block, and the refined intra prediction mode is a mode which minimizes an error from the reconstructed neighbor block based on prediction blocks generated with respect to the specific intra prediction mode.

In the present invention, when the intra prediction mode of the neighbor block is intra planar mode or intra DC mode, the refined intra prediction mode is determined as the intra prediction mode of the neighbor block.

In the present invention, the neighbor block includes at least one of a left neighbor block or an upper neighbor block of the current block, and the reconstructed reference pixel of the neighbor block includes at least one of a left boundary pixel, upper-left corner pixel, and upper boundary pixel adjacent to the neighbor block.

In the present invention, when the intra prediction mode of the left neighbor block is the same as that of the upper neighbor block, the refined intra prediction mode is determined as the intra prediction mode of the neighbor block.

The present invention further includes obtaining a mode index from the video signal, wherein the mode index represents an index indicating the prediction mode of the current block, and the intra prediction mode for the current block is selected based on the mode index.

In an apparatus for processing a video signal, the present invention provides an apparatus including an intra prediction unit, when a neighbor block adjacent to a current block is intra-coded, generating a prediction block for the neighbor block by using a reconstructed reference pixel of the neighbor block; determining a refined intra prediction mode of the neighbor block based on the prediction block, generating a prediction mode candidate list for the current block based on the refined intra prediction mode, selecting an intra prediction mode for the current block from the prediction mode candidate list, and performing prediction for the current block based on the intra prediction mode; and a reconstruction unit reconstructing the video signal based on the prediction result, wherein the refined intra prediction mode is a mode which minimizes an error between the prediction block and the reconstructed neighbor block.

The apparatus according to the present invention further includes a parsing unit obtaining a mode index from the video signal, wherein the mode index represents an index indicating the prediction mode of the current block, and the intra prediction mode for the current block is selected based on the mode index.

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, terms used in the present invention are selected from currently widely used general terms, but in a specific case, randomly selected terms by an applicant are used. In such a case, in a detailed description of a corresponding portion, because a meaning thereof is clearly described, the terms should not be simply construed with only a name of terms used in a description of the present invention and a meaning of the corresponding term should be comprehended and construed.

Further, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure, the present invention is not limited to the definitions of the terms. In this specification, for convenience of illustration, the term "coding unit" is employed as a unit used in a process of encoding or decoding a video signal, however, the present invention is not limited thereto, another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The intra prediction unit 185 may be largely divided into prediction mode coding and residual signal coding part. When a prediction mode is coded, the prediction mode of a neighbor block may be used as a predicted value for the prediction mode of a current block. Therefore, the more accurate the prediction mode of neighbor blocks is, the more accurate the prediction mode of the current block may be predicted. The present invention deals with methods for refining a prediction mode of a neighbor block.

The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include a parsing unit (not shown), an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive a video signal output from the encoder 100 of FIG. 1 and parse syntax elements from the video signal through a parsing unit (not shown). A parsed signal may be entropy-decoded through the entropy decoding unit 210 or transmitted to another functional unit.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 is a diagram illustrating a division structure of a coding unit according to an embodiment of the present invention.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of input image or a characteristic of input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3, the CTU corresponds to a root node and has a smallest depth (i.e., level 0) value. The CTU may not be split according to a characteristic of input image, and in this case, the CTU corresponds to a CU.

The CTU may be decomposed in a QT form and thus subordinate nodes having a depth of a level 1 may be generated. In a subordinate node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a subordinate node having a depth of a level 2, a node (i.e., a leaf node) that is no longer split corresponds to a CU. For example, as shown in FIG. 3B, CU(c), CU(h), and CU(i) corresponding to nodes c, h, and l are split twice in the CTU and have a depth of a level 2.

Further, at least one of nodes having a depth of a level 2 may be again split in a QT form. In a subordinate node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

The encoder may determine a maximum size or a minimum size of the CU according to a characteristic (e.g., a resolution) of video or in consideration of encoding efficiency. Information thereof or information that can derive this may be included in bitstream. A CU having a maximum size may be referred to as a largest coding unit (LCU), and a CU having a minimum size may be referred to as a smallest coding unit (SCU).

Further, the CU having a tree structure may be hierarchically split with predetermined maximum depth information (or maximum level information). Each split CU may have depth information. Because depth information represents the split number and/or a level of the CU, the depth information may include information about a size of the CU.

Because the LCU is split in a QT form, when using a size of the LCU and maximum depth information, a size of the SCU may be obtained. Alternatively, in contrast, when using a size of the SCU and maximum depth information of a tree, a size of the LCU may be obtained.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIG. 3, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller subordinate TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in entire TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra prediction or inter prediction. In order to more effectively code input image, the CU may be split into a prediction unit (PU).

A PU is a basic unit that generates a prediction block, and a prediction block may be differently generated in a PU unit even within one CU. The PU may be differently split according to whether an intra prediction mode is used or an inter prediction mode is used as a coding mode of the CU to which the PU belongs.

FIG. 4 is an embodiment to which the present invention is applied and is a diagram for illustrating a prediction unit.

A PU is differently partitioned depending on whether an intra-prediction mode or an inter-prediction mode is used as the coding mode of a CU to which the PU belongs.

FIG. 4(a) illustrates a PU in the case where the intra-prediction mode is used as the coding mode of a CU to which the PU belongs, and FIG. 4(b) illustrates a PU in the case where the inter-prediction mode is used as the coding mode of a CU to which the PU belongs.

Referring to FIG. 4(a), assuming the case where the size of one CU is 2N×2N (N=4, 8, 16 or 32), one CU may be partitioned into two types (i.e., 2N×2N and N×N).

In this case, if one CU is partitioned as a PU of the 2N×2N form, this means that only one PU is present within one CU.

In contrast, if one CU is partitioned as a PU of the N×N form, one CU is partitioned into four PUs and a different prediction block for each PU is generated. In this case, the partition of the PU may be performed only if the size of a CB for the luma component of a CU is a minimum size (i.e., if the CU is an SCU).

Referring to FIG. 4(b), assuming that the size of one CU is 2N×2N (N=4, 8, 16 or 32), one CU may be partitioned into eight PU types (i.e., 2N×2N, N×N, 2N×N, N×2N, nL×2N, nR×2N, 2N×nU and 2N×nD).

As in intra-prediction, the PU partition of the N×N form may be performed only if the size of a CB for the luma component of a CU is a minimum size (i.e., if the CU is an SCU).

In inter-prediction, the PU partition of the 2N×N form in which a PU is partitioned in a traverse direction and the PU partition of the N×2N form in which a PU is partitioned in a longitudinal direction are supported.

Furthermore, the PU partition of nL×2N, nR×2N, 2N×nU and 2N×nD forms, that is, asymmetric motion partition (AMP) forms, are supported. In this case, 'n' means a ¼ value of 2N. However, the AMP cannot be used if a CU to which a PU belongs is a CU of a minimum size.

In order to efficiently code an input image within one CTU, an optimum partition structure of a coding unit (CU), a prediction unit (PU) and a transform unit (TU) may be determined based on a minimum rate-distortion value through the following execution process. For example, an optimum CU partition process within a 64×64 CTU is described. A rate-distortion cost may be calculated through a partition process from a CU of a 64×64 size to a CU of an 8×8 size, and a detailed process thereof is as follows.

1) A partition structure of an optimum PU and TU which generates a minimum rate-distortion value is determined by performing inter/intra-prediction, transform/quantization and inverse quantization/inverse transform and entropy encoding on a CU of a 64×64 size.

2) The 64×64 CU is partitioned into four CUs of a 32×32 size, and an optimum partition structure of a PU and a TU which generates a minimum rate-distortion value for each of the 32×32 CUs is determined.

3) The 32×32 CU is partitioned into four CUs of a 16×16 size again, and an optimum partition structure of a PU and a TU which generates a minimum rate-distortion value for each of the 16×16 CUs is determined.

4) The 16×16 CU is partitioned into four CUs of an 8×8 size again, and an optimum partition structure of a PU and a TU which generates a minimum rate-distortion value for each of the 8×8 CUs is determined.

5) An optimum partition structure of a CU within a 16×16 block is determined by comparing the rate-distortion value of a 16×16 CU calculated in the process 3) with the sum of the rate-distortion values of the four 8×8 CUs calculated in the process 4). This process is performed on the remaining three 16×16 CUs in the same manner.

6) An optimum partition structure of a CU within a 32×32 block is determined by comparing the rate-distortion value of a 32×32 CU calculated in the process 2) with the sum of the rate-distortion values of the four 16×16 CUs calculated in the process 5). This process is performed on the remaining three 32×32 CUs in the same manner.

7) Finally, an optimum partition structure of a CU within a 64×64 block is determined by comparing the rate-distortion value of the 64×64 CU calculated in the process 1) with the sum of the rate-distortion values of the four 32×32 CUs obtained in the process 6).

In the intra-prediction mode, a prediction mode is selected in a PU unit and prediction and a reconfiguration are performed in an actual TU unit with respect to the selected prediction mode.

The TU means a basic unit by which actual prediction and a reconfiguration are performed. The TU includes a transform block (TB) for a luma component and a TB for two chroma components corresponding to the TB for a luma component.

In the example of FIG. 3, as in the case where one CTU is partitioned as a quadtree structure to generate a CU, a TU is hierarchically partitioned as a quadtree structure from one CU to be coded.

The TU is partitioned as a quadtree structure, and thus a TU partitioned from a CU may be partitioned into smaller lower TUs. In HEVC, the size of the TU may be determined to be any one of 32×32, 16×16, 8×8 and 4×4.

Referring back to FIG. 3, it is assumed that the root node of a quadtree is related to a CU. The quadtree is partitioned until a leaf node is reached, and the leaf node corresponds to a TU.

More specifically, a CU corresponds to a root node and has the smallest depth (i.e., depth=0) value. The CU may not be partitioned depending on the characteristics of an input image. In this case, a CU corresponds to a TU.

The CU may be partitioned in a quadtree form. As a result, lower nodes of a depth 1 (depth=1) are generated. Furthermore, a node (i.e., leaf node) that belongs to the lower nodes having the depth of 1 and that is no longer partitioned corresponds to a TU. For example, in FIG. 3(b), a TU(a), a TU(b) and a TU(j) corresponding to nodes a, b and j, respectively, have been once partitioned from the CU, and have the depth of 1.

At least any one of the nodes having the depth of 1 may be partitioned in a quadtree form again. As a result, lower nodes having a depth 2 (i.e., depth=2) are generated. Furthermore, a node (i.e., leaf node) that belongs to the lower nodes having the depth of 2 and that is no longer partitioned corresponds to a TU. For example, in FIG. 3(b), a TU(c), a TU(h) and a TU(i) corresponding to nodes c, h and i, respectively, have been twice partitioned from the CU, and have the depth of 2.

Furthermore, at least any one of the nodes having the depth of 2 may be partitioned in a quadtree form again. As a result, lower nodes having a depth 3 (i.e., depth=3) are generated. Furthermore, a node (i.e., leaf node) that belongs to the lower nodes having the depth of 3 and that is no longer partitioned corresponds to a CU. For example, in FIG. 3(b), a TU(d), a TU(e), a TU(f) and a TU(g) corresponding to nodes d, e, f and g, respectively, have been partitioned three times from the CU, and have the depth of 3.

A TU having a tree structure has predetermined maximum depth information (or the greatest level information) and may be hierarchically partitioned. Furthermore, each partitioned TU may have depth information. The depth information may include information about the size of the TU because it indicates the partitioned number and/or degree of the TU.

Regarding one TU, information (e.g., a partition TU flag "split_transform_flag") indicating whether a corresponding TU is partitioned may be transferred to the decoder. The partition information is included in all of TUs other than a TU of a minimum size. For example, if a value of the flag indicating whether a corresponding TU is partitioned is "1", the corresponding TU is partitioned into four TUs again. If a value of the flag indicating whether a corresponding TU is partitioned is "0", the corresponding TU is no longer partitioned.

FIGS. 5 and 6 are embodiments to which the present invention is applied. FIG. 5 is a diagram for illustrating an intra-prediction method and FIG. 6 is a diagram for illustrating a prediction direction according to an intra-prediction mode.

Referring to FIG. 5, the decoder may derive the intra-prediction mode of a current processing block (S501).

In intra-prediction, a prediction direction for the location of a reference sample used for prediction may be included depending on a prediction mode. In this specification, an intra-prediction mode having a prediction direction is called an intra-direction prediction mode "Intra_Angular prediction mode" or an intra-direction mode. In contrast, an intra-prediction mode not having a prediction direction includes intra planar (INTRA_PLANAR) prediction mode and an intra DC (INTRA_DC) prediction mode.

Table 1 illustrates names associated with the intra-prediction modes, and FIG. 6 illustrates prediction directions according to the intra-prediction modes.

TABLE 1

| intra-prediction mode | Associated name |
| --- | --- |
| 0 | INTRA_PLANAR |
| 1 | INTRA_DC |
| 2 . . . 34 | Intra-direction (INTRA_ANGULAR2 . . . INTRA_ANGULAR34) |

In intra-prediction, prediction for a current processing block is performed based on a derived prediction mode. The reference sample and detailed prediction method used for prediction are different depending on the prediction mode. If a current block is encoded in the intra-prediction mode, the decoder may derive the prediction mode of the current block in order to perform prediction.

The decoder may check whether neighboring samples of the current processing block can be used for prediction and configure reference samples to be used for the prediction (S502).

In intra-prediction, neighboring samples of a current processing block mean a sample that neighbors the left boundary of the current processing block of an nS×nS size, a total of 2×nS samples that neighbor the bottom left, a sample that neighbors the top boundary of the current processing block, a total of 2×nS samples that neighbor the top right, and a sample that neighbors the top left of the current processing block.

However, some of the neighboring samples of the current processing block may have not been decoded or may not be available. In this case, the decoder may configure the reference samples to be used for prediction by substituting unavailable samples with available samples.

The decoder may filter the reference sample depending on an intra-prediction mode (S503).

Whether the filtering is to be performed on the reference sample may be determined based on the size of the current processing block. Furthermore, a method of filtering the reference sample may be determined by a filtering flag transferred by an encoder.

The decoder may generate a prediction block for the current processing block based on the intra-prediction mode and the reference samples (S504). That is, the decoder may generate the prediction block (i.e., generate the prediction sample) for the current processing block based on the intra-prediction mode derived in the intra-prediction mode derivation step S501 and the reference samples obtained through the reference sample configuration step S502 and the reference sample filtering step S503.

If the current processing block is encoded in the INTRA_DC mode, in order to minimize the discontinuity of the boundary between processing blocks, at step S504, the left boundary sample (i.e., a sample neighboring a left boundary within the prediction block) and top boundary sample (i.e., a sample neighboring a top boundary within the prediction block) of the prediction block may be filtered.

Furthermore, at step S504, filtering may be applied to the left boundary sample or the top boundary sample as in the INTRA_DC mode with respect to the vertical mode and horizontal mode of the intra-direction prediction modes.

More specifically, if the current processing block has been encoded in the vertical mode or horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for the prediction may be much shorter than the distance from a reference sample used for the prediction.

Accordingly, the decoder may adaptively apply filtering to left boundary samples or top boundary samples depending on whether an intra-prediction direction is the vertical direction or horizontal direction. That is, if the intra-prediction direction is the vertical direction, filtering may be applied to the left boundary samples. If the intra-prediction direction is the horizontal direction, filtering may be applied to the top boundary samples.

FIG. 7 is a flow diagram illustrating a method for encoding an intra prediction mode according to an embodiment of the present invention.

In general, if a picture is divided into sub-blocks, a current block to be coded and neighbor blocks have similar image characteristics. In the case of intra prediction mode, it is highly probable that a current block and its neighbor blocks may have the same or similar intra prediction mode. Therefore, the encoder may use the prediction mode of a neighbor block to encode the prediction mode of a current block.

First, when neighbor blocks are intra-coded, the encoder may check or derive the prediction mode of the neighbor block S710.

For example, based on the prediction mode of a left neighbor block and the prediction mode of an upper neighbor block, the prediction mode of a current block may be determined, and the prediction mode of the corresponding neighbor block may be determined by Most Probable Modes (MPM). At this time, MPM may refer to the modes used for preventing loss due to duplicate information at the time of prediction mode coding by taking account of the similarity between a current block and a neighbor block, thereby improving coding efficiency. Determining MPM may also be expressed as listing up MPM candidates (or an MPM list).

The encoder may check whether the prediction mode of the left neighbor block is the same as the prediction mode of the upper neighbor block S720.

When the prediction mode of the left neighbor block is different from the prediction mode of the upper neighbor block, a first MPM may be set to the prediction mode of the left neighbor block, a second MPM may be set to the prediction mode of the upper neighbor block, and a third MPM may be set to one of the intra planar mode, intra DC mode, or intra vertical mode S730.

Meanwhile, when the prediction mode of the left neighbor block is the same as the prediction mode of the upper neighbor block, the encoder may check whether the prediction mode of the left neighbor block is smaller than 2 S740.

When the prediction mode of the left neighbor block is smaller than 2, the first MPM may be set to the intra planar mode, the second MPM may be set to the intra DC mode, and the third MPM may be set to the intra vertical mode S750.

Meanwhile, when the prediction mode of the left neighbor block is not smaller than 2, the first MPM may be set to the prediction mode of the left neighbor block, the second MPM may be set to (prediction mode−1 of the left neighbor block), and the third MPM may be set to (prediction mode+1 of the left neighbor block) S760.

And the encoder may determine whether the optimal intra prediction mode to be applied to the current block belongs to the MPM candidates set previously.

When the intra prediction mode of the current block belongs to the MPM candidates, the encoder may encode an MPM flag and an MPM index. Here, an MPM flag may indicate whether the intra prediction mode of the current block is derived from neighbor intra-predicted blocks (namely the intra prediction mode of the current block belongs to the MPM).

Also, an MPM index may indicate which MPM mode among the MPM candidates is applied as an intra prediction mode of the current block.

On the other hand, when the intra prediction mode of the current block does not belong to the MPM candidates, the encoder may encode the intra prediction mode of the current block.

As described above, the encoder may use the prediction mode of a neighbor block to encode the prediction mode of the current block, and to this end, the present invention may provide a method for refining the prediction mode of a neighbor block.

FIG. 8 is a flow diagram illustrating a method for decoding an intra prediction mode according to an embodiment of the present invention.

The decoder may obtain a flag indicating whether a prediction mode with respect to a current block (or a current PU) is included in the MPM S810. For example, the flag information may be denoted as prev_intra_luma_pred_flag, and the decoder may check according to the flag information whether the prediction mode of a current block is included in the MPM S820.

If the prediction mode of the current block is included in the MPM, the decoder may obtain an MPM index S830. For example, if prev_intra_luma_pred_flag=1, the decoder may obtain an MPM index.

And the decoder may obtain a prediction value for the current block based on the intra prediction mode indicated by the MPM index and restore the current block by using the obtained prediction value.

On the other hand, if the prediction mode of the current block is not included in the MPM, the decoder may obtain a residual prediction mode of the current block S840. Here, the residual prediction mode may refer to the remaining prediction modes not included in the MPM and may be expressed by rem_intra_luma_pred_mode. For example, the residual prediction mode may refer to the remaining prediction modes except for the intra planar mode, intra DC mode, and intra vertical mode.

In the same way, the decoder may obtain a prediction value for a current block based on the intra prediction mode corresponding to the residual prediction mode and reconstruct the current block by using the obtained prediction value.

As described above, when the number of encoding modes is N, the minimum number of bits required to express the entire modes is Log 2(N). When the MPM is used, however, a smaller number of bits than the number of intra modes are assigned. Therefore, a considerably small number of bits are needed to express the modes for a current block.

For example, given that the number of intra prediction modes is 35 and the number of MPM is 3, if the MPM is not used at all, 6 bits of information have to be transmitted to express 35 intra prediction modes. On the other hand, if three MPM are used and the intra prediction mode of a current block corresponds to one of MPM candidates, only two bits are required to transmit information. Moreover, even if the MPM is not used, since one of the remaining 32 intra prediction modes may be selected except for the three intra prediction modes that may be expressed by MPM, the number of bits may be reduced.

FIG. 9 is a flow diagram illustrating a method for encoding a video signal based on a refined prediction mode of a neighbor block according to an embodiment of the present invention.

FIG. 9 shows a flow chart for constructing a prediction mode candidate list, selecting one from among the candidates, and coding an index for the selected candidate.

Before registering a prediction mode for a neighbor block to the prediction mode candidate list, the present invention may refine the corresponding prediction mode and set the refined prediction mode to the candidate list. In this case, according to the refined prediction mode, the number of candidates may be changed or index allocation for the candidates may be changed.

To examine the encoding process in more detail, first, when a neighbor block is intra-coded, the encoder may check or derive the prediction mode of the neighbor block, and a refinement process may be applied to the prediction mode of the neighbor block S910. The refinement process will be described in more detail with reference to FIGS. 11 to 15.

The encoder may generate a prediction mode candidate list by using the refined prediction mode S920.

The encoder may select the optimal prediction mode among the prediction mode candidate list S930. For example, the optimal prediction mode may refer to a prediction mode for which a Rate Distortion (RD) cost is minimized with respect to the prediction modes included in the prediction mode candidate list.

The encoder may encode a mode index corresponding to the optimal prediction mode S940.

According to one embodiment of the present invention, the prediction mode candidate list may correspond to an MPM candidate list, and the mode index may correspond to an MPM index.

FIG. 10 is a flow diagram illustrating a method for decoding a video signal based on a refined prediction mode of a neighbor block according to an embodiment of the present invention.

FIG. 10 illustrates a decoding process, and in the same way as in the encoder, the prediction mode of a neighbor block may be refined, a candidate list may be generated, and a prediction mode may be selected from a mode index delivered through a bit stream.

To examine the decoding process in more detail, the decoder may check or derive the prediction mode of a neighbor block and apply a refinement process to the prediction mode of the neighbor block S1010. The refinement process will be described in more detail with reference to FIGS. 11 to 15.

The decoder may generate a prediction mode candidate list by using a refined prediction mode S1020.

Meanwhile, the decoder may parse the mode index from the bit stream S1030.

The decoder may select a prediction mode corresponding to the parsed mode index from the prediction mode candidate list S1040.

The decoder may generate a prediction value of a current block based on the selected prediction mode S1050 and reconstruct the current block by using the prediction value.

FIG. 11 illustrates a method for refining a prediction mode of a neighbor block according to an embodiment of the present invention.

The present invention provides a method and an apparatus for refining the prediction mode of a neighbor block.

One embodiment of the present invention performs prediction for prediction mode candidates by using at least one of reconstructed pixel of a spatially neighboring block or adjacent reference pixels and provides a method for selecting a prediction mode which minimizes a cost of representing similarity to a reconstructed block.

Method for Refining the Prediction Mode of a Neighbor Block

The present invention may use the prediction mode of a neighbor block as the prediction mode of a current block at the time of intra prediction. However, since the intra prediction mode of a neighbor block has been determined in an attempt to minimize a Rate-Distortion (RD) cost with respect to the corresponding block, direction of pixels may not be realized accurately. Therefore, if the intra prediction mode of a neighbor block is used to predict the prediction mode of a current block after the intra prediction mode is refined, a more accurate prediction mode may be obtained.

Various methods may be applied to refine the intra prediction mode of a neighbor block.

In one embodiment, referring to FIG. 11, since reconstructed pixels (R) of a neighbor block are all available, the prediction mode of the neighbor block may be refined by using the reconstructed pixels. Although the present document uses a term of refinement, the present invention is not limited to the specific term, and another term such as change, modification, and update may be used in place of refinement. In what follows, specific embodiments for refining the prediction mode of a neighbor block are described.

Embodiment 1

The present invention may generate a prediction block by using reconstructed reference pixels (R) for all intra prediction modes and measure the error between the prediction block and a reconstructed neighbor block to select a prediction mode which minimizes the error. Here, the reconstructed reference pixels (R) may indicate the region shown in FIG. 11.

In another example, the error value is transformed, and a bit rate is predicted from the transformed result (for example, a sum of absolute values for transform coefficients), after which a prediction mode showing the smallest Rate-Distortion (RD) cost may be selected.

The prediction mode selected as described above may be determined as the prediction mode of a neighbor block.

Embodiment 2

The present invention may apply the refinement process only for a specific intra prediction mode. In other words, the refinement process may be applied only for the intra prediction mode belonging to a predetermined range from the coded intra prediction mode of a neighbor block or the intra prediction mode having a similar direction.

For example, when the coded intra prediction mode of a neighbor block is 26 (intra vertical mode), the refinement process may be applied for the prediction modes within a range of (+/−) 3 ((26−3) to (26+3)).

Embodiment 3

The present invention may apply the refinement process selectively only to an intra prediction mode that satisfies a specific condition.

For example, when the prediction mode of a neighbor block is intra planar mode or intra DC mode, the refinement process may not be applied.

As another example, when the intra prediction mode of a left neighbor block is the same as that of an upper neighbor block, the refinement process may not be applied.

In a yet another example, the two embodiments may be applied in a combined manner. For example, when the prediction mode of a neighbor block is intra planar mode or intra DC mode, the embodiment 1 may be applied while the embodiment 2 may be applied for the remaining modes.

Embodiment 4

The present invention may apply the refinement process selectively only for the intra prediction mode which satisfies a region condition. For example, the refinement process may not be applied for a neighbor block belonging to the same LCU but may be applied for a neighbor block belonging to a different LCU.

Also, the two embodiments may be applied in a combined manner. For example, the embodiment 2 may be applied for a neighbor block belonging to the same LCU, but the embodiment 1 may be applied for a neighbor block belonging to a different LCU.

The present invention is not limited to the specific embodiment; for example, the region condition may be applied not only for the LCU but also for a unit larger than a prediction unit.

Embodiment 5

The present invention may apply the refinement process by using at least one of the embodiment 1 to 4.

For example, when the prediction mode of a neighbor block is intra planter mode or intra DC mode, the embodiment 1 may be applied while, for the remaining modes, the embodiment 2 may be applied or the embodiment 3 and 4 may be applied simultaneously.

The present invention is not limited to the specific embodiment, and other embodiments described in the present document may be combined to be applied in an inferred manner.

FIG. 12 illustrates a method for refining a prediction mode of a neighbor block according to an embodiment of the present invention when the neighbor block is not intra-coded.

In the case of inter-prediction, intra-prediction or inter-prediction may be applied to the blocks within a P picture/B picture. When a current block is an intra prediction block, its neighbor block may not be an intra-coded block. For example, a neighbor block may be an inter-block.

Therefore, when a neighbor block is not an intra-block, the present invention may refine the prediction mode of a neighbor block by applying various embodiments as described below.

Even if a neighbor block of an intra prediction block within an inter prediction picture is not an intra prediction block, one embodiment of the present invention provides a method for deriving an intra prediction mode through a method for refining a prediction mode.

Even when a neighbor block is coded by a different coding scheme from that applied for a current block, one embodiment of the present invention provides a method for refining the prediction mode of the neighbor block to be suitable for the coding scheme of the current block.

Embodiment 1

When the prediction mode of a neighbor block is intra prediction mode, the present invention may apply at least one of the embodiment 1 to 5 described with reference to FIG. 11.

In another example, when the prediction mode of a neighbor block is intra prediction mode, the corresponding intra prediction mode may be used as the prediction mode of a current block.

Embodiment 2

When the prediction mode of a neighbor block is inter-prediction mode, the present invention may measure the Rate-Distortion (RD) cost for the entire intra prediction modes and select an intra prediction mode which yields the lowest RD cost.

Embodiment 3

When a neighbor block is coded according to a different coding scheme, the present invention may derive a prediction mode so that the prediction mode is suitable for the coding scheme of a current block.

The aforementioned coding scheme may include at least one of Conditional Nonlinear Transform (CNT), Short Distance Intra Prediction (SDIP), and adaptive intra-prediction coding scheme.

The Conditional Nonlinear Transform (CNT) scheme refers to a scheme which performs prediction for image data consisting of N pixels by using the most recently reconstructed data in pixel units.

To obtain the most recently reconstructed data in pixel units, inverse transform has to be performed by using the transform coefficients obtained previously, after which residual data is reconstructed to be added to prediction data. However, according to the conventional coding scheme, since the transform coefficients may be obtained by applying transformation only when prediction for N data is completed, it is impossible to reconstruct data in pixel units.

However, as shown in Eq. 1 below, if a prediction process for the original data (x, N×1 vector) is expressed by the relationship between reference data $x_0$ and an N×1 residual vector P, transform coefficients may be obtained at once from Eq. 2 and 3 as follows.

$$x = F\hat{r} + Bx_0 \qquad [\text{Eq. 1}]$$

$$x = FT\hat{c} + Bx_0 \qquad [\text{Eq. 2}]$$

$$x_R = -Bx_0 = G\hat{c}, \hat{c} = G^{-1}x_R \qquad [\text{Eq. 3}]$$

In other words, the equations above describe a method in which transform coefficients unavailable during the prediction process are denoted by a vector $\hat{r}$ of unknown numbers and are obtained inversely from the equations. The prediction process using the most recently reconstructed pixel data may be described through the matrix F of Eq. 1.

The Short Distance Intra Prediction (SDIP) scheme will be described in more detail with reference to FIG. 14, and the adaptive intra-prediction scheme will be described in more detail with reference to FIG. 15.

In what follows, a method for deriving a prediction mode to be suitable for the coding scheme applied to a current block when a neighbor block is coded according to a different coding scheme from that for the current block will be described with specific embodiments.

Embodiment (3-1)

When a current block is coded according to the CNT scheme while a neighbor block is intra-coded, the present invention may use a prediction mode for the neighbor block after refining the corresponding prediction mode based on the CNT scheme.

First, the encoder/decoder may generate a prediction block for a neighbor block according to the CNT scheme, obtain a residual block from the generated prediction block, and select an intra-prediction mode which minimizes the energy of the residual block. At this time, the aforementioned process may be applied for the entire intra prediction modes. Or the refinement process may be applied only for the intra-prediction mode within a predetermined range from the intra prediction mode applied to the neighbor block or the intra prediction mode having a similar direction.

For example, when the intra prediction mode applied to a neighbor block is 26 (intra vertical mode), the refinement process may be applied for the prediction modes within a range of (+/−) 3 ((26−3) to (26+3)).

Embodiment (3-2)

When a current block is coded according to the intra-prediction scheme while a neighbor block is coded according to the CNT scheme, the present invention may use a prediction mode for the neighbor block after refining the corresponding prediction mode according to the intra-prediction scheme.

For example, after prediction blocks are generated for each intra prediction mode by using reconstructed pixels for a neighbor block and adjacent reference pixels of the neighbor block, an intra prediction mode which minimizes the error between the reconstructed pixels of the neighbor block and the prediction block may be selected.

In one embodiment, when the intra prediction mode supported by the CNT scheme is limited to a specific intra prediction mode, the refinement process may be applied only for the intra prediction mode within a predetermined range or the intra prediction mode having a similar direction.

For example, when the CNT scheme supports intra prediction mode 2, 4, 6, and 8, and a neighbor block is coded according to the intra prediction mode 4 of the CNT scheme, the refinement process may be applied only for the intra prediction mode 3, 4, and 5.

Embodiment (3-3)

When a current block is coded according to the SDIP scheme while a neighbor block is intra-coded, the present invention may use a prediction mode for the neighbor block after refining the corresponding prediction mode based on the SDIP scheme.

When the current block is coded according to the SDIP scheme, the PU of the current block may have a rectangular shape as shown in FIG. 12. At this time, the PU of the neighbor block may also be assumed to have a rectangular shape (R), after which the intra prediction mode may be refined.

Also, when the intra prediction mode supported by the SDIP scheme is limited to a specific intra prediction mode, the refinement process may be applied only for the intra prediction mode within a predetermined range or the intra prediction mode having a similar direction.

FIG. 13 illustrates a method for refining a prediction mode of a neighbor block based on the shape or the size of a neighbor block according to an embodiment of the present invention.

One embodiment of the present invention provides a method for refining a coding mode when the shape and the size of a neighbor block are different from those of a current block.

One embodiment of the present invention provides a method for changing the shape or the type of a neighbor block to be the same as that of a current block or using the original shape (or type) of the neighbor block.

One embodiment of the present invention provides a method for determining a prediction direction more accurately by setting the width or the height of a neighbor block to occupy as many as M or N lines.

As shown in FIG. 13, the shape or the size of a neighbor block may be different from that of a current block. In this case, the following embodiments may be applied as a method for configuring neighbor blocks for which a refinement process is to be applied.

Embodiment 1

The present invention may use the original block shape/size when a neighbor block is initially coded. For example, when a current block is an 8×8 block and a neighbor block is a 16×16 block, a refinement process may be performed for the 16×16 sized neighbor block.

Embodiment 2

The present invention may perform a refinement process by assuming that the shape or the size of a neighbor block is the same as that of a current block when the shape or the size of the neighbor block is different from that of the current block. For example, a refinement process may be performed after the PU within a neighbor block of FIG. 12 is configured in the same way as R.

Embodiment 3

As shown in FIG. 13, the present invention may configure a block consisting of M horizontal lines or N vertical lines as a neighbor block. At this time, if M and N are set to be smaller than the height or width of a current block, a refinement process may be performed so that the intra prediction mode has a direction similar to that in the boundary region of the current block.

FIG. 14 illustrates a method for performing intra prediction based on a relationship between block partition information and direction of a coding mode according to an embodiment of the present invention.

FIG. 14 illustrates the SDIP scheme that may be applied to the embodiments described above.

Intra prediction may be applied to a square-shaped partition block. This approach yields a small error when samples located close to reference samples are predicted. Prediction accuracy may be degraded, however, according as a predicted position from the reference sample is increased. Therefore, to compensate for the performance degradation due to distance, a method for reducing the distance between the reference sample and the predicted position is introduced, which is called a Short Distance Intra Prediction (SDIP) scheme.

According to one embodiment of the present invention, the shape of a prediction block at the time of intra prediction may be defined to be rectangular or line-shaped. By predicting and reconstructing the inside of a block in smaller rectangle or line units, the prediction error may be further reduced.

Since the present invention performs the prediction and reconstruction process in rectangle or line units rather than square units, accuracy of the prediction and the reconstruction may vary depending on prediction directions. For example, as shown in FIG. 14(a), when a current block is intra vertical mode, the prediction error may be reduced effectively if the current block is divided along four horizontal directions by taking into account the distance from reference samples.

In another example, as shown in FIG. 14(b), when a current block is intra horizontal mode, the prediction error may be effectively reduced if the current block is divided along vertical directions so that the distance from the left reference sample is shorter than the distance from the upper reference sample.

FIG. 15 illustrates adaptive mode selection when an intra prediction mode is performed with 1/M precision according to an embodiment of the present invention.

FIG. 15 illustrates an adaptive intra prediction coding scheme which may be applied to the embodiments described above.

In the case of intra prediction, the direction of prediction is +/−[0, 2, 5, 9, 13, 17, 21, 26, 32]/32 degrees. The direction angle represents a difference between a lower row of the PU and a reference row above the PU in the case of vertical mode while the direction angle represents a difference between the rightmost column and the leftmost reference column of the PU in the case of horizontal mode. And pixel reconstruction is performed by using linear interpolation of upper or left reference samples with ⅟₃₂-pixel accuracy.

In the present invention, at least one of the number of modes or mode position may be selected adaptively for intra prediction. For example, FIG. 15 is one embodiment to which the present invention is applied, where the number of modes, L, which corresponds to the number of direction angles, may be selected adaptively within the region extending up to the direction angle of 45 degrees to the right in the intra vertical mode.

FIG. 15(*a*) illustrates an example in which arbitrary 8 modes having ⅟₃₂ accuracy are selected from 2N regions extending up to the direction angle of 45 degrees to the right in the intra vertical mode while FIG. 15(*b*) illustrates an example in which L modes having 1/M accuracy (for example, M=32) are selected from 2N regions extending up to the direction angle of 45 degrees to the right in the intra vertical mode.

The present invention provides a method for selecting the number of modes, L, adaptively in the intra prediction. For example, the number of modes, L, may be selected differently according to the image characteristics of a current block. At this time, the image characteristics of a current block may be checked from adjacent reconstructed samples.

Reference samples (or reference array) used in the intra prediction may be used as the adjacent reconstructed samples. For example, the reference samples may be those located at the positions of p(−1, −2N+1) through p(−1, −1) to p(2N−1, −1).

The image characteristics may be determined by an upper reference array or left reference array. However, the present invention is not limited to the upper or left sample array. For example, two lines of upper or left sample arrays or a region larger than the above may also be used.

FIG. 16 is a flow diagram illustrating a method for refining a prediction mode of a neighbor block according to an embodiment of the present invention.

A video signal processing apparatus to which the present invention is applied may be included in or applied to the encoder and/or decoder. In what follows, the present invention will be described with respect to the decoder.

First, the decoder may check the prediction mode or coding scheme of a current block or a neighbor block.

If it is determined from the checking result that the neighbor block is intra-coded, the decoder may generate a prediction block for the neighbor block by using reconstructed reference pixels of the neighbor block S1610. Here, the neighbor block may include at least one of a left-side neighbor block or an upper-side neighbor block of the current block, and the reconstructed reference pixel of the neighbor block may include at least one of a left boundary pixel, upper-left corner pixel, and upper boundary pixel adjacent to the neighbor block. For example, the reconstructed reference pixel may refer to the reconstructed reference pixel (R) of FIG. 11.

The decoder may determine a refined intra prediction mode of the neighbor block based on the prediction block S1620. At this time, the refined intra prediction mode may refer to the mode which minimizes the error between the prediction block and a reconstructed neighbor block.

In one embodiment, a prediction block for the neighbor block may be generated for the entire intra prediction modes.

In this case, the refined intra prediction mode represents a mode which minimizes an error from the neighbor block reconstructed based on prediction blocks generated for the entire intra prediction modes.

In one embodiment, a prediction block for the neighbor block may be generated for a specific intra prediction mode. In this case, the specific intra prediction mode may represent an intra prediction mode within a predetermined range from the intra prediction mode of the neighbor block, and the refined intra prediction mode may represent a mode which minimizes an error from the reconstructed neighbor block based on prediction blocks generated for the specific intra prediction mode.

In one embodiment, when the intra prediction mode of the neighbor block is intra planar mode or intra DC mode, the refined intra prediction mode may be determined as the intra prediction mode of the neighbor block.

In one embodiment, when the intra prediction mode of the left neighbor block is the same as that of the upper neighbor block, the refined intra prediction mode may be determined as the intra prediction mode of the neighbor block.

The decoder may generate a prediction mode candidate list for the current block based on the refined intra prediction mode S1630.

The decoder may select an intra prediction mode for the current block from the prediction mode candidate list S1640.

In one embodiment, the decoder may obtain a mode index from the video signal. Here, the mode index represents an index indicating a prediction mode of the current block, and in this case, the intra prediction mode for the current block may be selected based on the mode index.

The decoder may perform prediction for the current block based on the intra prediction mode S1650.

The decoder may reconstruct a video signal by summing the prediction result value and decoded residual data.

As described above, the embodiments described in the present invention may be performed by being implemented on a processor, a microprocessor, a controller or a chip. For example, the functional units depicted in FIG. 1 and FIG. 2, may be performed by being implemented on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for processing a video signal, comprising:
generating, based on a neighbor block adjacent to a current block being intra-coded with a first prediction block, a second prediction block for the neighbor block using a reconstructed reference pixel of the neighbor block,
wherein a shape or a size of the first prediction block is different from a shape or a size of the current block, and
wherein a shape or a size of the second prediction block is the same as the shape or size of the current block;
determining a refined intra prediction mode of the neighbor block based on the prediction block, wherein the refined intra prediction mode represents a mode which minimizes an error between the second prediction block and a reconstructed neighbor block;
generating a prediction mode candidate list for the current block based on the refined intra prediction mode;
selecting an intra prediction mode for the current block from the prediction mode candidate list; and
performing a prediction for the current block based on the intra prediction mode.

2. The method of claim 1, wherein a prediction mode for the neighbor block is generated for the entire intra prediction modes, and
wherein the refined intra prediction mode is a mode which minimizes an error from the reconstructed neighbor block based on prediction blocks generated for the entire intra prediction modes.

3. The method of claim 1, wherein a prediction mode for the neighbor block is generated for a specific intra prediction mode, and the specific intra prediction mode represents an intra prediction mode within a predetermined range from an intra prediction mode of the neighbor block; and
the refined intra prediction mode is a mode which minimizes an error from the reconstructed neighbor block on the basis of prediction blocks generated for the specific intra prediction mode.

4. The method of claim 1, further comprising determining, based on an intra prediction mode of the neighbor block being an intra planar mode or an intra DC mode, the refined intra prediction mode as an intra prediction mode of the neighbor block.

5. The method of claim 1, wherein the neighbor block comprises at least one of a left neighbor block or an upper neighbor block of the current block, and
wherein the reconstructed reference pixel of the neighbor block comprises at least one of a left boundary pixel, an upper-left corner pixel, or an upper boundary pixel adjacent to the neighbor block.

6. The method of claim 5, further comprising determining, based on an intra prediction mode of the left neighbor block being the same as an intra prediction mode of the upper neighbor block, the refined intra prediction mode as an intra prediction mode of the neighbor block.

7. The method of claim 1, further comprising
obtaining a mode index from the video signal,
wherein the mode index represents an index indicating a prediction mode of the current block, and
wherein an intra prediction mode for the current block is selected based on the mode index.

8. An apparatus for processing a video signal, comprising:
a storage device configured to store the video signal; and
a processor coupled to the storage device, and configured to:
generate, based on a neighbor block adjacent to a current block being intra-coded with a first prediction block, a second prediction block for the neighbor block using a reconstructed reference pixel of the neighbor block;
determine a refined intra prediction mode of the neighbor block based on the second prediction block;
generate a prediction mode candidate list for the current block based on the refined intra prediction mode;
select an intra prediction mode for the current block from the prediction mode candidate list;
perform a prediction for the current block based on the intra prediction mode; and
reconstruct the video signal based on the prediction result,
wherein a shape or a size of the first prediction block is different from a shape or a size of the current block,
wherein a shape or a size of the second prediction block is the same as the shape or size of the current block, and
wherein the refined intra prediction mode is a mode which minimizes an error between the second prediction block and the reconstructed neighbor block.

9. The apparatus of claim 8, wherein a prediction mode for the neighbor block is generated for the entire intra prediction modes, and
wherein the refined intra prediction mode is a mode which minimizes an error from the reconstructed neighbor block based on prediction blocks generated for the entire intra prediction modes.

10. The apparatus of claim 8, wherein a prediction mode for the neighbor block is generated for a specific intra prediction mode, and the specific intra prediction mode represents an intra prediction mode within a predetermined range from an intra prediction mode of the neighbor block, and
wherein the refined intra prediction mode is a mode which minimizes an error from the reconstructed neighbor block on the basis of prediction blocks generated for the specific intra prediction mode.

11. The apparatus of claim 8, wherein the neighbor block comprises at least one of a left neighbor block or an upper neighbor block of the current block, and
wherein the reconstructed reference pixel of the neighbor block comprises at least one of a left boundary pixel, an upper-left corner pixel, or upper boundary pixel adjacent to the neighbor block.

12. The apparatus of claim 8, wherein the processor is further configured to:
obtain a mode index from the video signal,
wherein the mode index represents an index indicating the prediction mode of the current block, and
wherein an intra prediction mode for the current block is selected based on the mode index.

* * * * *